March 8, 1927.  1,620,207
G. E. HOWARD
METHOD AND APPARATUS FOR FEEDING MOLTEN GLASS
Filed Feb. 20, 1922 2 Sheets-Sheet 1
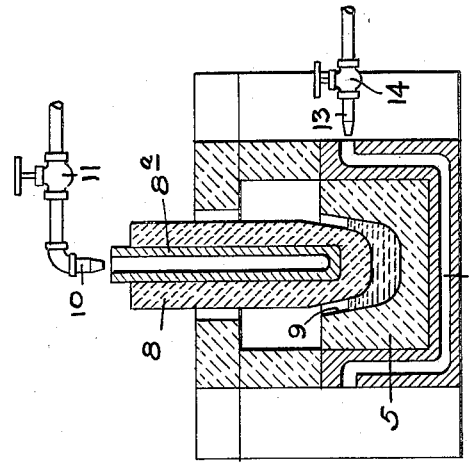
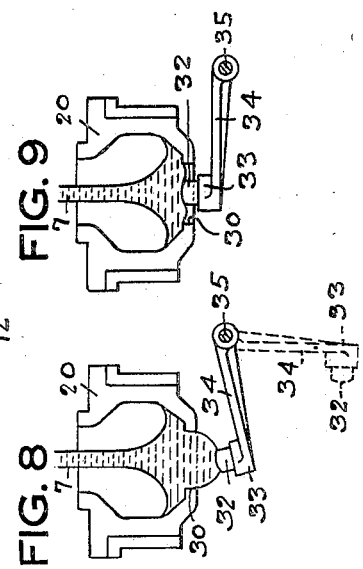
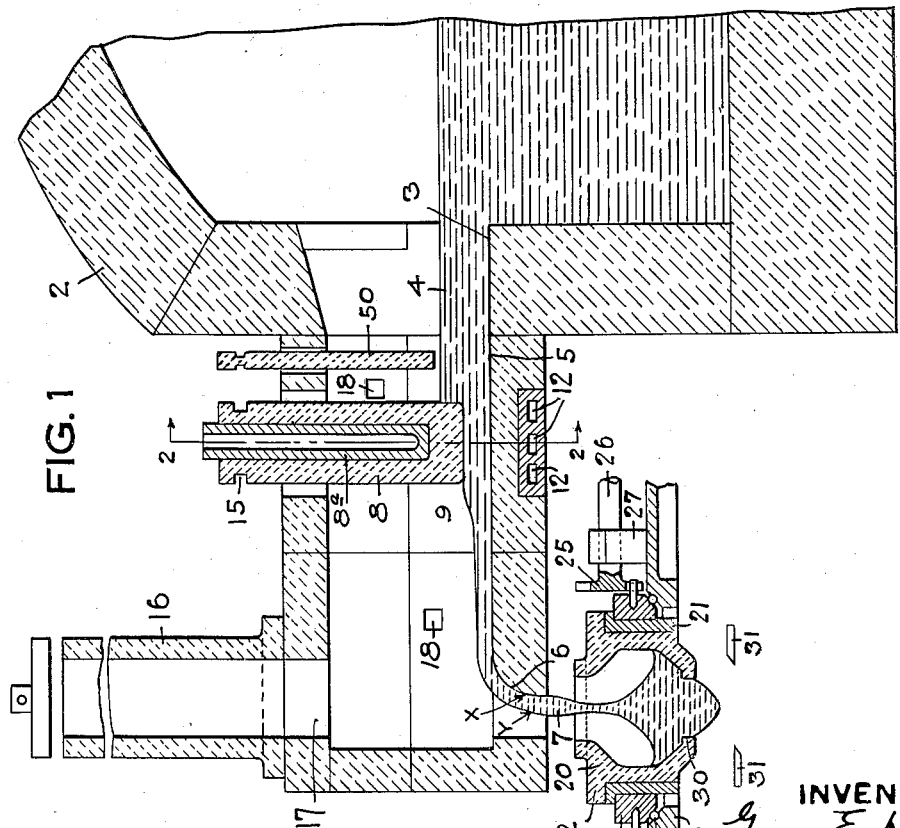
INVENTOR
George E. Howard,
By Kay, Totten & Brown.
Attorneys March 8, 1927.
G. E. HOWARD
1,620,207
METHOD AND APPARATUS FOR FEEDING MOLTEN GLASS
Filed Feb. 20, 1922
2 Sheets-Sheet 2
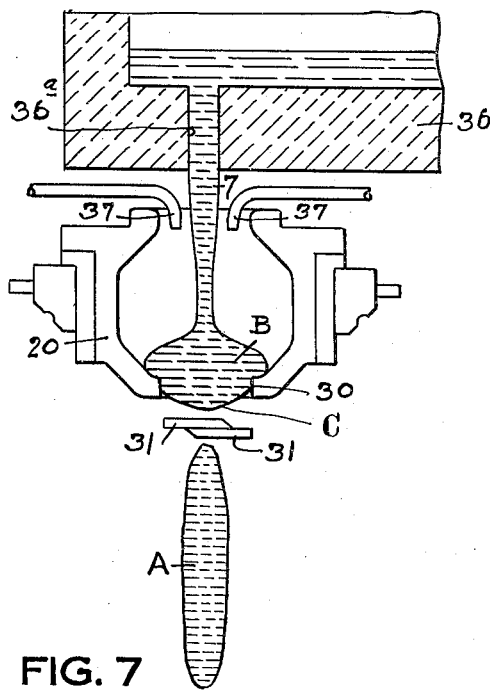
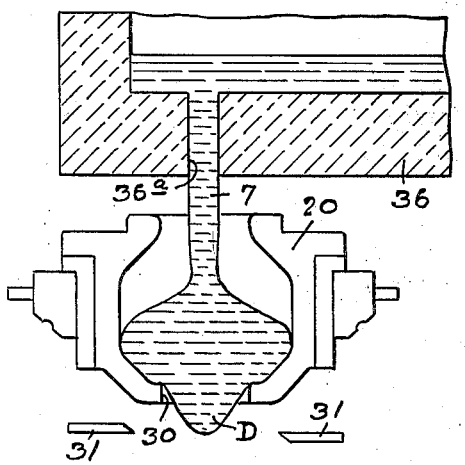
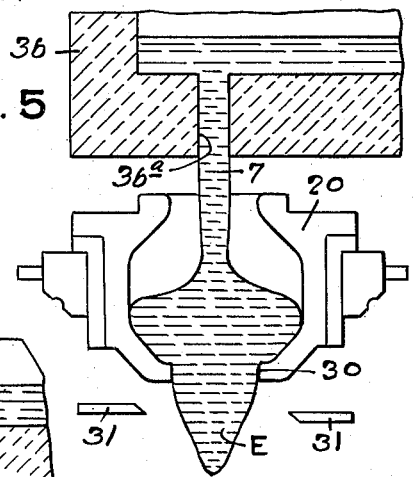
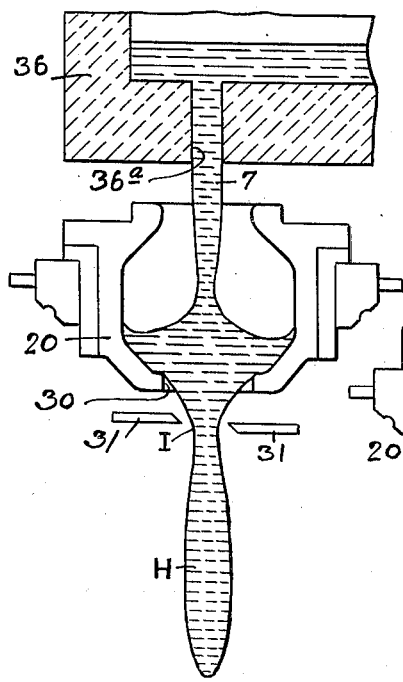
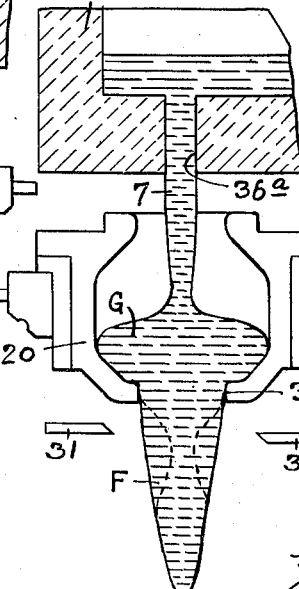
INVENTOR
George E. Howard
By Kay, Totten & Brown,
Attorneys Patented Mar. 8, 1927.

1,620,207

UNITED STATES PATENT OFFICE.

GEORGE E. HOWARD, OF BUTLER, PENNSYLVANIA, ASSIGNOR, BY MESNE ASSIGNMENTS, TO HARTFORD-EMPIRE COMPANY, OF HARTFORD, CONNECTICUT, A CORPORATION OF DELAWARE.

METHOD AND APPARATUS FOR FEEDING MOLTEN GLASS.

Application filed February 20, 1922. Serial No. 537,873.

My invention relates to methods and apparatus for separating mold charges of molten glass from a flowing stream for the purpose of feeding charges to automatic or semi-automatic glass-blowing or pressing machines or to other glass-working apparatus.

One object of my invention is to provide improved means for symmetrically shaping a mass of molten glass and for maintaining the mass at even temperature and consequently at even fluidity.

Another object of my invention is to provide a glass feeding method in which the temperature of each gather of glass shall not only be symmetrical with respect to its axis of formation, but shall be substantially uniform and non-stratified from end to end.

A further object of my invention is to provide a method and means for increasing the permissible weight of a gather of glass, while at the same time retaining the glass in a suitable shape for delivery to the mold.

A further object of my invention is to provide a glass-feeding method and means having a wide range of speed for the gathering operation.

A still further object of my invention is to provide a glass feeding method which shall not require the heating of large masses of glass outside of the tank and which, therefore, shall reduce the amount of fuel required.

In the best type of glass-feeding machines now in commercial use, the gather or mold charge is formed by passing the glass through an orifice in the bottom of a forehearth or boot which forms an extension from the usual tank, the gather being formed partly by gravity and partly by applying an impulse to the flowing glass. While the gather is still hanging freely below the discharge outlet it is cut off by means of shears located fairly close below the orifice and the gather falls by gravity directly into the mold, or over some form of chute which guides it to the mold.

In the older stream-feeding type of glass-feeding apparatus, which is still in use to a limited extent, a continuous stream flows from a similar orifice and a metallic accumulating or husbanding cup, which usually forms part of the shear, is used to catch or delay the stream during the transfer of molds into which the completed gathers drop.

This stream-feeding method is unsatisfactory for three reasons. First, the gather has poor shape or no definite shape at all; second, because the glass is caught by coiling or lapping it in the husbanding cup, the gathered glass is usually full of trapped bubbles and has wide extremes of temperature owing to the contact of the glass with the cold cup and the shears; and third, a forehearth with an orifice in its bottom is required to guide the stream into the mold, and this orifice requires frequent renewal which is difficult on account of the glass in the forehearth. It is necessary to chill the glass, to chip out the orifice bushing and replace it, and then to reheat the glass, which causes considerable delay.

My present invention belongs to the stream-feeding type and employs a husbanding cup, but avoids the disadvantages just mentioned by heating the cup to avoid temperature difficulties and by rotating the cup to avoid lapping difficulties, and also to assist in shaping the gather. The husbanding cup is preferably lined with a refractory material which is highly heated either by contact with the glass or by auxiliary heating means; so that the molten glass will adhere to the cup and is not entirely emptied therefrom when the cup is discharged.

The rotary motion imparted to the cup sets up centrifugal force, which acts to form the gather symmetrically and assists in the other feeding operations, as will more fully appear below.

My invention may be operated either with a continuous stream of glass, or with a pulsating stream produced according to well known glass-feeding methods, and it is to be understood that my invention is not restricted to the use of a stream of glass continuously flowing at a uniform rate.

This invention is related to the invention set forth and claimed in the copending application of John R. Keller, filed March 7, 1922, Serial No. 541,775, in which the principle of delaying a descending stream of glass by centrifugal force is broadly described and claimed. My present application relates to the method and means by which the stream of glass is established above the rotary cup, the use of a hot cup as distinguished from an artificially cooled cup, and the particular methods by which I impart suitable shapes to the glass gathers accumulated in the rotary cup.

In the accompanying drawing, Fig. 1 is a longitudinal vertical sectional view taken through a portion of a glass tank equipped with glass feeding apparatus constructed in accordance with my invention; Fig. 2 is a transverse vertical sectional view taken substantially on the line 2—2, Fig. 1; Figs. 3 to 7, inclusive, are diagrammatic vertical sectional views of a portion of the apparatus showing the successive stages in which the glass is accumulated, shaped and delivered; Fig. 8 is a diagrammatic view showing the application of an outside member to assist the retraction of the glass into the cup after severance; and Fig. 9 is a diagrammatic view similar to Fig. 8 showing a further stage in the action of the outside member.

In Fig. 1 the numeral 2 indicates a portion of the refining end of a tank furnace having the usual outlet 3 through which the glass 4 flows into a runway 5 terminating in a lip 6 over which the glass flows and descends in a vertical stream 7. A gate 8 may be interposed in the channel 9 of the runway 5 to control the flow of glass through the runway, and the gate and the runway may be provided with suitable cooling arrangements for regulating the temperature of the glass. As shown, the gate 8 is made hollow and is provided with a metal tube 8ª having a closed bottom, and water may be introduced into the tube 8ª through a suitable nozzle 10 controlled by a valve 11. The runway 5 may be constructed of firebrick or the like, and may have water channels 12 through which water may be circulated from one or more nozzles 13 controlled by valves 14. The gate 8 is provided with means for raising or lowering it vertically, such, for example, as an annular groove 15 in which a lifting fork may be received, the lifting fork being adjusted vertically by well known means which are not shown on the drawing. A chimney 16 may communicate with the runway through an opening 17 and may be utilized to carry off the gases of combustion from the furnace 2, these gases passing through the runway and keeping the runway at substantially the same temperature as the refining end of the furnace without any special heating arrangements. One or more openings 18 may be provided in the side walls of the runway for the introduction of heating flames or cooling air current if the temperature conditions in the runway should become abnormal.

Below the lip 6 over which the stream of glass escapes from the runway, is a cup 20 constructed of, or lined with, refractory material and arranged to be revolved by any suitable means, and at such speed as to set up centrifugal force in the descending glass, this speed being made variable for the purpose of controlling the weight and shape of glass gathers, as will more fully be described below. The driving means for the cup may be arranged to stop the rotation of the cup periodically for the discharge of the glass, or the glass may be discharged by merely reducing the speed of the rotation of the cup without stopping it.

The particular means shown on the drawing for mounting and rotating the cup 20 consists of a metal ring 21 in which the cup 20 is mounted by means of its upper flange 22, and a gear ring 23 secured to the ring 21 and carrying a series of gear pins 24 which are engaged by the teeth of a gear wheel 25 which is carried by a shaft 26 mounted in a bearing 27 and connected to any suitable source of power, not shown. The gear ring 23 and the adjacent stationary support 28 are provided with ball races in which are received bearing balls 29. It will be evident that when the shaft 26 is rotated the cup will be rotated on a vertical axis and that the speed of rotation may be changed by varying the speed at which the shaft 26 is driven.

The refactory cup 20 has a bottom opening 30 arranged with its center in the vertical axis of rotation of the cup 20. Below this opening is a pair of shears 31 which sever the gathers of glass after they are formed beneath the cup. The vertical position of the shears 31 is preferably made adjustable so as to give an added means of controlling the size and shape of the gathers. As shown, the lip 6, the stream 7, the vertical axis of the cup 20 and the meeting point of the shears 31 are all in the axial center line of the opening 30 and in line with the axis of rotation of the gather cup. It will be understood, however, that the device will operate with the stream offset from its axial center line, and the shears may also have a slight adjustment from this line.

It will be noted that the descending stream of glass 7 is of materially smaller diameter than the bottom opening 30 in the cup 20. Therefore, it is necessary to provide means for stopping the flow of glass through the outlet 30 when the machine is started. Also, when feeding very large gathers of glass weighing several pounds it may also be desirable to assist the centrifugal action of the cup in holding up the severed stub of glass by means of an outside member applied beneath the outlet. If such member were of the full width of the outlet 30 its action would be resisted by the glass descending through this outlet, which would tend to jam the closure member, but if the outside member is made of smaller diameter than the outlet 30 it may be used to lift the point of the protruding glass, and the centrifugal action of the cup will draw up the glass around the outside interrupting member and will produce a sufficient retraction of the glass into the rotary cup without smearing glass around the edges of the cup outlet. Such an arrangement is shown in Figs. 8 and 9 where the outside interrupter member is a block 32, suitably of wood, carried on a holder 33 which is mounted on the end of an arm 34 pivoted at 35 for vertical swinging movement toward and away from the outlet 30. When glass is being fed from the cup the interrupter is in the dotted-line position shown in Fig. 8, and offers no obstruction to the glass. Just after each gather of glass is severed by the shears, the arm 34 may be rocked up to bring the member 32 into contact with the point of protruding glass, and may then be rocked further into the position shown in Fig. 9, thus assisting the centrifugal force of the cup 20 in retracting the protruding glass into the cup.

The action of this apparatus may be best understood by referring to Figs. 3 to 7 which are diagrammatic views in which the descending stream of glass 7 is shown issuing from an opening 36ª in a receptacle 36, this opening and receptacle being shown in a general and diagrammatic way since the stream of glass may be produced not only by flowing over a lip, as in the apparatus of Fig. 1, but by flowing through a forehearth outlet, or through any other sort of opening from any sort of glass receptacle. While it is one of my objects to permit the usual forehearth to be entirely dispensed with, such a forehearth may be employed if desired, and the other advantages of my invention may be fully realized.

In order to assist in keeping the interior of the cup at a high temperature, one or more gas burners 37 may be arranged to enter the cup at its upper edge. However, the radiation of heat from the hot glass will keep the interior of the cup at a high temperature, and the burners 37 will not be required in all cases, although they are useful in starting the operation.

In Fig. 3, the gather of glass A has just been severed by the shears 31, and the cup 20 is rotating and is beginning to accumulate glass, as shown at B. The rotation of the cup is either reduced or stopped before the gather A is cut off, and the rotation is started or increased either just before the gather is severed, at the moment of severing, or just after severance, these details of operation being variable in order to produce particular results as to the size and shape of the gathers, and as to the retraction of the glass left above the shears. As stated above, the cup 20 is kept hot, and the hot glass B adhering to the cup revolves with the cup. This revolution of the mass, by reason of the centrifugal force which is developed, sends the particles of glass in an outward direction, this action being more pronounced away from the center line, and becoming zero at the center line. The cohesion of the particles of molten glass will exert a pull on the central part of the glass and will pick up the stub C from the shears and draw it upwardly.

The stream 7 flowing downwardly will enlarge the portion B in the cup 20 while this expanding action takes place. The speed of revolution of the cup, the time of accumulation, and the weight of glass accumulated at B will all be factors in determining just what occurs in the cup, and it is evident that by making the cup 20 of large capacity, and by rotating it rapidly, a considerable amount of glass can be gathered in the cup by centrifugal force, thus producing a series of heavy mold charges weighing several pounds.

After a sufficient quantity of glass has accumulated in the cup, the rotation of the cup is somewhat slowed down, and the mass B, having reached considerable weight and size, will tend to overcome the centrifugal action on the particles of glass and will begin to sag down through the cup opening 30, as shown at D, Fig. 4. This sagging effect will be most pronounced at the center of the opening 30 where the action of centrifugal force is least. This action will be small at first, but as it continues it produces the effect shown at E, Fig. 5, the glass having drained to a considerable extent from the cup 20 and being pendant beneath the cup.

Fig. 6 shows the continuation of the flow of glass through the cup outlet 30, the pendent glass having assumed somewhat the shape shown at F. When this point is reached the cup may be slowed down still further and may be entirely stopped, which will increase the downward flow of the glass which then descends by unchecked gravity. Some of the glass will adhere to the hot walls of the cup 20, as shown at G, Fig. 6.

When a sufficient amount of glass is pendant below the cup outlet 30, and before this hanging mass of glass is allowed to break into a stream, the cup is rotated rapidly, the increase being preferably very sudden. The effect of this rotation is to expand by centrifugal force the glass which is still in the cup, and the particles of glass so driven outward will exert a pull on the glass immediately below the cup outlet 30. This upward pull will be opposed by the downward gravity pull exerted by the pendant glass H producing a contraction or neck, as shown at I in Fig. 7. The shears 31 then sever the glass, the complete gather A drops away, and the cycle of operations is repeated.

One of the chief aims of this invention is to deliver each mold charge in a condition of uniform temperature and fluidity. The glass delivered in a stream from a tank is not of uniform temperature. This temperature control is important because of the close relation which exists between the viscosity of molten glass and the temperature, and the rapid changes in viscosity which take place in glass at temperatures between 1600° F. and 1900° F., which are the ordinary temperatures for working this material into finished ware. Glass flowing from a tank tends to cool rapidly in its passage through a forehearth or through a runway, such as the runway 5 described above, and the hotter portions of glass tend to go over the lip 6 at the point shown by the arrow X, Fig. 1. Other portions, being slightly cooler, will flow down outside of the hot glass X, somewhat as shown by the arrow Y, Fig. 1. Similar variations in temperature between different parts of the descending stream exist when the glass is fed through an opening such as the opening 35 in Figs. 3 to 7. The centrifugal action of the cup 20 serves to thoroughly mix the glass and reheats those portions which have been slightly chilled, and thereby prevents any stratification in the finished gathers.

The portion of glass shown at C, Fig. 3, which has been in contact with the shears 31 and which, after severance, is exposed to the air, will cool slightly, forming a skin of greater viscosity than the glass B in the cup. This aids in holding up the mass B.

As stated above, this invention may be carried out not only with a continuously flowing stream of glass, but with an interrupted stream such as that produced by glass feeders of the well known gob-feeding type, the glass being discharged from the feeder into the cup and the interruption of the flow being produced at the time of severing the gather below the cup. Such a feeder is shown in the British patent to Hartford-Fairmont Company, No. 142,785. By this means the gravity action of the glass within the cup is decreased since no additional glass is flowing into the cup from above. This facilitates the retraction of the stub above the shears. Then, when the interrupted stream resumes its flow the accumulation and discharge action will be hastened as compared to the action of a continuously flowing stream feed, because of the fact that for any given rate per minute an interrupted-stream feed discharges a stream of larger section and more weight in the discharge period than a continuously flowing stream.

The construction shown in Figs. 1 and 2 has the further advantage that the runway is heated by gases drawn directly from the furnace and discharged through the chimney 16, thereby eliminating or reducing the extra fuel required to heat the runway. A vertical screen 50 may be placed over the glass so as to prevent the "stingout" of the furnace, which varies an intensity, thus tending to cause variation of the heat in the interior of the runway 5. This "stingout" of the furnace is very variable near the crown of the furnace, but is practically zero at the metal line, so that this screen will steady the heat and make it practically depend upon the stack draft.

I claim as my invention:

1. The method of producing mold charges of molten glass by centrifugal force, that comprises receiving a descending stream of glass in a heated receptacle having a discharge opening in the bottom thereof, and controlling the flow of glass from the receptacle by rotating said receptacle at periodically varying speeds to set up centrifugal forces in the glass.

2. The method of producing mold charges of molten glass that comprises receiving a descending stream of glass in a heated receptacle having a discharge opening in its bottom, rotating the said receptacle to accumulate a mass of glass therein, and reducing the speed of rotation of said receptacle to permit glass to flow through said opening.

3. The method of producing mold charges of molten glass that comprises receiving a descending stream of glass in a heated receptacle having a discharge opening in its bottom, rotating the said receptacle to accumulate a mass of glass therein by centrifugal force, partially reducing the speed of said receptacle, thereby permitting glass to flow through said opening by gravity retarded by centrifugal force, and then stopping the rotation of said receptacle, thereby permitting glass to flow through said opening by unchecked gravity while leaving a portion of said glass adhering to the hot walls of said receptacle.

4. The method of producing mold charges of molten glass that comprises receiving a descending stream of glass in a heated receptacle having a discharge opening in its bottom, rotating the said receptacle to accumulate a mass of glass therein, reducing the speed of rotation of said receptacle to permit glass to flow through said opening, then increasing the speed of rotation of said receptacle to produce an attenuation in the glass beneath the said opening, and severing the glass at the point of attenuation.

5. The method of producing mold charges of molten glass that comprises receiving a descending stream of glass in a heated receptacle having a discharge opening in its bottom, rotating the said receptacle to accumulate a mass of glass therein by centrifugal force, partially reducing the speed of said receptacle, thereby permitting glass to flow through said opening by gravity, retarded by centrifugal force, then stopping the rotation of said receptacle, thereby permitting glass to flow through said opening by unchecked gravity while leaving a portion of said glass adhering to the hot walls of said receptacle, then increasing the speed of rotation of said receptacle to produce an attenuation in the glass beneath the said opening, and severing the glass at the point of attenuation.

6. The method of producing mold charges of molten glass by centrifugal force, that comprises receiving a descending stream of glass in a heated receptacle having a discharge opening in its bottom, and, by rotating said receptacle at speeds varying substantially at regular intervals, periodically developing centrifugal force to periodically accumulate a mass of glass in said receptacle.

7. The method of producing mold charges of molten glass that comprises receiving a pulsating descending stream of glass in a heated receptacle having a discharge opening in its bottom, rotating the said receptacle to accumulate a mass of glass therein, and reducing the speed of rotation of said receptacle to permit glass to flow through said opening.

8. The method of producing mold charges of molten glass that comprises receiving a pulsating descending stream of glass in a heated receptacle having a discharge opening in its bottom, rotating the said receptacle to accumulate a mass of glass therein by centrifugal force, partially reducing the speed of said receptacle, thereby permitting glass to flow through said opening by gravity retarded by centrifugal force, and then stopping the rotation of said receptacle, thereby permitting glass to flow through said opening by unchecked gravity while leaving a portion of said glass adhering to the hot walls of said receptacle.

9. The method of producing mold charges of molten glass that comprises receiving a pulsating descending stream of glass in a heated receptacle having a discharge opening in its bottom, rotating the said receptacle to accumulate a mass of glass therein, reducing the speed of rotation of said receptacle to permit glass to flow through said opening, then increasing the speed of rotation of said receptacle to produce an attenuation in the glass beneath the said opening, and severing the glass at the point of attenuation.

10. The method of producing mold charges of molten glass that comprises receiving a pulsating descending stream of glass in a heated receptacle having a discharge opening in its bottom, rotating the said receptacle to accumulate a mass of glass therein by centrifugal force, partially reducing the speed of said receptacle, thereby permitting glass to flow through said opening by gravity retarded by centrifugal force, then stopping the rotation of said receptacle, thereby permitting glass to flow through said opening by unchecked gravity while leaving a portion of said glass adhering to the hot walls of said receptacle, then increasing the speed of rotation of said receptacle to produce an attenuation in the glass beneath the said opening, and severing the glass at the point of attenuation.

11. The method of producing mold charges of molten glass that comprises receiving a descending stream of molten glass in a heated refractory receptacle having a discharge opening in its bottom, rotating said receptacle to accumulate a mass of glass therein by centrifugal force, reducing the speed of rotation of said receptacle, thereby allowing glass to escape through said opening, and controlling the speed of rotation of said receptacle during the flow of glass through said opening, and thereby imparting a controllable shape to the gathers of glass produced beneath said opening.

12. The method of producing mold charges of molten glass that comprises drawing molten glass from a tank through a runway in communication with said tank, maintaining the temperature of said runway at substantially the same temperature as the tank by exhausting the heated gases from the tank through said runway, discharging the glass from said runway over a lip or dam to produce a descending stream of glass, and acting upon said stream by centrifugal force to subdivide said stream into a succession of mold charges.

13. Apparatus for producing mold charges of molten glass having a predetermined size and shape, which comprises means for producing a descending stream of glass, a rotatable receptacle having a discharge outlet in alignment with the stream of glass and larger than said stream, means for starting the accumulation of a mass of glass in said receptacle by temporarily interrupting the flow of said glass, and causing a portion thereof to adhere to said receptacle, and means for rotating said receptacle, at speeds varying substantially at regular intervals, to develop centrifugal force in said glass and thereby to further control the accumulation of the glass in said receptacle.

14. Apparatus for producing mold charges of molten glass, comprising a tank furnace, a runway leading therefrom, having a gate for controlling the passage of a stream of glass through said runway and having an opening for permitting the stream of glass to flow intact from said runway, means for cooling said gate to regulate the temperature of the glass flowing from the runway, and means for accumulating mold charges of glass from said stream.

15. The method of producing mold charges of molten glass that comprises conducting the glass in a controlled stream from a melting furnace through a runway and thence into a rotatable receptacle beneath said runway, and rotating said receptacle at periodically varying speeds to apply centrifugal force to said glass for subdividing the glass into a series of mold charges.

16. Apparatus for producing mold charges of molten glass comprising a tank furnace, a runway extending therefrom, means for conducting gases of combustion from said furnace through said runway, a gate for controlling the flow of glass through said runway, means for discharging the glass from said runway, means for forming the glass into a succession of mold charges, and means for cooling the said gate and for thereby regulating the temperature of the glass flowing through said runaway.

17. Apparatus for producing mold charges of molten glass comprising a rotatable cup mounted for rotation on a vertical axis and means for rotating said cup comprising a series of gear pins extending from said cup, a driving gear engaging said pins, and means for rotating said gear.

18. Apparatus for producing mold charges of molten glass comprising a rotatable receptacle mounted for rotation on a vertical axis and having an axial discharge opening in its bottom, and means for temporarily interrupting the flow of glass through said discharge opening comprising an interrupter member of less diameter than said discharge opening and means for raising said member toward said discharge opening and for removing said member therefrom.

19. Apparatus for producing mold charges of molten glass comprising a rotatable receptacle mounted for rotation on a vertical axis, and having an axial discharge opening in its bottom, means for severing the glass flowing through said opening, and means for checking the descent of the stub of glass remaining after severance comprising an interrupter member of smaller diameter than the said opening and means for bringing said member into engagement with said protruding glass and for raising the point of said protruding glass toward the interior of said receptacle.

20. The method of producing mold charges of molten glass having a predetermined size and shape, which comprises the steps of receiving a descending stream of glass in a continuously rotating receptacle having a discharge outlet in alignment with the stream of glass and larger than said stream, periodically delivering a mold charge from said outlet, severing said charge, then applying a supporting member to the glass at the outlet of the receptacle, then accumulating the glass in the receptacle by means of centrifugal force, then removing the supporting member and permitting the glass to issue from the outlet to form the next charge.

In testimony whereof I, the said GEORGE E. HOWARD have hereunto set my hand.

GEORGE E. HOWARD.